(12) United States Patent
Yamamura et al.

(10) Patent No.: US 8,570,615 B2
(45) Date of Patent: Oct. 29, 2013

(54) IMAGE SCANNING DEVICE

(75) Inventors: Akira Yamamura, Toyokawa (JP);
Masahiko Tanaka, Toyokawa (JP);
Kenji Sawada, Toyokawa (JP); Yuichi Akahori, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 229 days.

(21) Appl. No.: 13/080,732

(22) Filed: Apr. 6, 2011

(65) Prior Publication Data

US 2011/0261418 A1    Oct. 27, 2011

(30) Foreign Application Priority Data

Apr. 26, 2010 (JP) ................................. 2010-100940

(51) Int. Cl.
*H04N 1/04* (2006.01)

(52) U.S. Cl.
USPC ........................... 358/474; 358/475; 358/496

(58) Field of Classification Search
USPC ......... 358/474, 475, 509, 497, 496, 483, 482, 358/513, 514
See application file for complete search history.

(56) References Cited

U.S. PATENT DOCUMENTS

| | | | | |
|---|---|---|---|---|
| 5,597,997 | A * | 1/1997 | Obata et al. | 235/455 |
| 6,198,551 | B1 * | 3/2001 | Tabata | 358/514 |
| 6,377,360 | B1 * | 4/2002 | Hattori | 358/1.5 |
| 6,735,000 | B2 * | 5/2004 | Shimomura et al. | 358/509 |
| 6,757,084 | B2 * | 6/2004 | Kurita et al. | 358/509 |
| 7,042,599 | B2 * | 5/2006 | Yokota et al. | 358/475 |
| 7,391,543 | B2 * | 6/2008 | Ohara | 358/483 |
| 7,623,143 | B2 * | 11/2009 | Kitao | 347/116 |
| 7,715,066 | B2 * | 5/2010 | Michiie | 358/474 |
| 7,733,538 | B2 * | 6/2010 | Kanesaka et al. | 358/474 |
| 7,796,310 | B2 * | 9/2010 | Hasegawa et al. | 358/488 |
| 8,169,674 | B2 * | 5/2012 | Kim | 358/504 |
| 2006/0164506 | A1 * | 7/2006 | Kitao | 347/236 |
| 2007/0177234 | A1 | 8/2007 | Morisaki | |
| 2007/0285740 | A1 | 12/2007 | Onishi et al. | |
| 2008/0111055 | A1 * | 5/2008 | Sakai et al. | 250/205 |
| 2009/0015883 | A1 | 1/2009 | Kim | |
| 2009/0015884 | A1 | 1/2009 | Cho et al. | |
| 2009/0015886 | A1 | 1/2009 | Kim et al. | |
| 2009/0041488 | A1 * | 2/2009 | Lee | 399/51 |
| 2009/0316229 | A1 * | 12/2009 | Sakai et al. | 358/474 |
| 2011/0157661 | A1 | 6/2011 | Kim et al. | |

FOREIGN PATENT DOCUMENTS

| | | |
|---|---|---|
| JP | 2004-320603 A | 11/2004 |
| JP | 2007-201952 A | 8/2007 |
| JP | 2007-300536 A | 11/2007 |
| JP | 2009-022007 A | 1/2009 |
| JP | 2009-025679 A | 2/2009 |

OTHER PUBLICATIONS

Office Action (Notification of Reasons for Refusal) dated Mar. 13, 2012, issued in corresponding Japanese Patent Application No. 2010-100940, and an English Translation thereof. (9 pages).

* cited by examiner

*Primary Examiner* — Negussie Worku (74) *Attorney, Agent, or Firm* — Buchanan Ingersoll & Rooney PC (57) ABSTRACT

An image scanning device includes: a light source; a light guide for converting light from the light source into a linear light beam and applying the linear light beam onto a reading position; an image reading element for receiving the light beam reflected from the reading position; and a light intensity sensor for detecting an intensity of the light emitted from the light source.

13 Claims, 5 Drawing Sheets

IMAGE SCANNING DEVICE

RELATED APPLICATION

The priority application Number Japanese Patent Application 2010-100940 upon which this application is based is hereby incorporated by reference.

BACKGROUND OF THE INVENTION

1. Field of the Invention

The present invention relates to an image scanning device that is used in an image forming apparatus for reading images, the image forming apparatus including, for example, copiers, printers, facsimiles and combined machines thereof. More particularly, the invention relates to an image scanning device wherein light from a light source is guided into a light guide and converted into a linear light beam which is applied onto a reading position. In a case where the intensity of light emitted from the light source varies due to change in the characteristics of the light source or the like, the image scanning device of the invention can quickly detect the change in light intensity and provide quick and proper correction of the intensity or distribution of the linear light beam emitted from the light source through the light guide.

2. Description of the Related Art

The image forming apparatus, such as copiers, printers, facsimiles and combined machines thereof, employs the image scanning device for digitizing or copying a document image and the like.

Such image scanning devices typically employ a contact image sensor (CIS system) or a charge-coupled device (CCD system).

The image scanning device employing the CIS system can be downsized so as to be suitable for reading document. However, this type of scanning device has a short focal depth and is not adapted to scan a three-dimensional object. On the other hand, the image scanning device employing the CCD system is adapted to scan the three-dimensional object but requires an increased optical path length between the reading position irradiated with light and an image reading element. As a result, this type of image scanning device has a larger size than that employing the CIS system.

Figure 1:
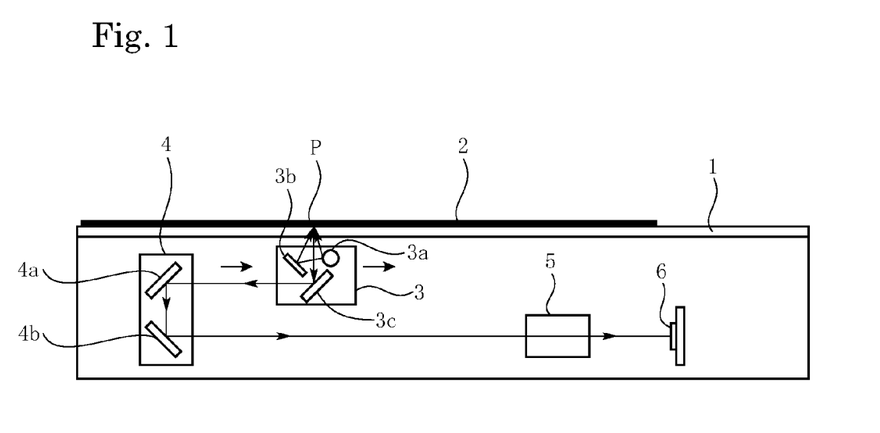
FIG. 1 is a schematic diagram illustrating how a conventional image scanning device reads a document placed on a glass platen.

In the image scanning device employing the CCD system, a document 2 placed on a glass platen 1 is typically scanned as follows. As shown in FIG. 1, light from a light source 3a disposed in a first slider unit 3 driven by a motor (not shown) or the like and the light emitted from the light source 3a and reflected by a reflector plate 3b are applied onto a reading position P for the document 2. The light reflected from the document 2 and carrying image information is reflected by a first reflective mirror 3c disposed in the first slider unit 3.

The light carrying the image information and reflected by the first reflective mirror 3c is reflected by a second reflective mirror 4a and a third reflective mirror 4b disposed in a second slider unit 4 driven by a motor (not shown) or the like. The reflected light is focused by a lens 5 onto a photoreceptive surface of an image reading element 6.

Subsequently, the above-described first slider unit 3 and second slider unit 4 are operated to scan the whole document 2 on the glass platen 1.

While the conventional scanning devices have generally employed fluorescent lamps, halogen lamps and the like as the above light source 3a, the use of light-emitting diode (LED) light source or organic electroluminescent element is drawing attention from the standpoint of power saving and low heat generation.

More recently, devices, as disclosed in Japanese Unexamined Patent Publications No. 2007-300536 and 2009-25679, have been proposed wherein an LED light source is provided at an end of an elongate light guide so that the light from the LED light source is applied by the light guide in the form of the linear light beam.

In the case where the light guide emits the light from the LED light source in the form of the linear light beam, it is necessary to make proper settings of intensity and distribution of the linear light beam applied from the LED light source through the light guide.

The proper settings of intensity and distribution of the linear light beam applied from the LED light source through the light guide may be made as follows. The above first slider unit and second slider unit are moved to locate the light guide with the LED light source at a suitable position relative to the glass platen, or commonly at position corresponding to a shading sheet as a white reference member provided at an end of the glass platen.

The linear light beam is applied onto the shading sheet via the light guide while the reflected light beam therefrom is made incident on the photoreceptive surface of the image reading element. Proper adjustments are accomplished by correcting the intensity of the linear light beam applied from the LED light source through the light guide and an amplification factor of the image reading element.

If the intensity of the light emitted from this LED light source varies due to the change in the characteristics of the LED light source, the intensity and distribution of the linear light beam applied from the LED light source through the light guide is corrected properly. Each time the correction is made, the above-described operations must be done which include: moving the first slider unit and second slider unit to locate the light guide with the LED light source at position corresponding to the shading sheet; applying the linear light beam to the shading sheet through the light guide and making the reflected light therefrom incident on the photoreceptive surface of the image reading element; and correcting the intensity of the linear light beam applied from the LED light source through the light guide and the amplification factor of the image reading element.

However, such operations are cumbersome and time consuming so that the image forming apparatus is significantly decreased in image formation efficiency. Particularly in the device disclosed in Japanese Unexamined Patent Publication No. 2009-25679 wherein the light guide is provided with the LED light sources at opposite ends thereof and the LED light sources are activated in turn to make adjustments, the operations become more complicated and time consuming. An image scanning device equipped with an automatic document feeder for automatically feeding a large quantity of documents will cause a significant decrease in the image formation efficiency of the image forming apparatus.

SUMMARY OF THE INVENTION

An image scanning device according to the invention comprises: a light source; a light guide for converting light from the light source into a linear light beam and applying the linear light beam onto a reading position; an image reading element for receiving the light beam reflected from the reading position; and a light intensity sensor for detecting an intensity of the light emitted from the light source.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Image scanning devices according to the embodiments of the invention will be specifically described with reference to the accompanying drawings. It is to be noted that the image scanning devices of the invention are not limited to the following embodiments but changes or modifications may be made thereto as needed so long as such changes or modifications do not depart from the scope of the invention.

Embodiment 1

Figure 2:
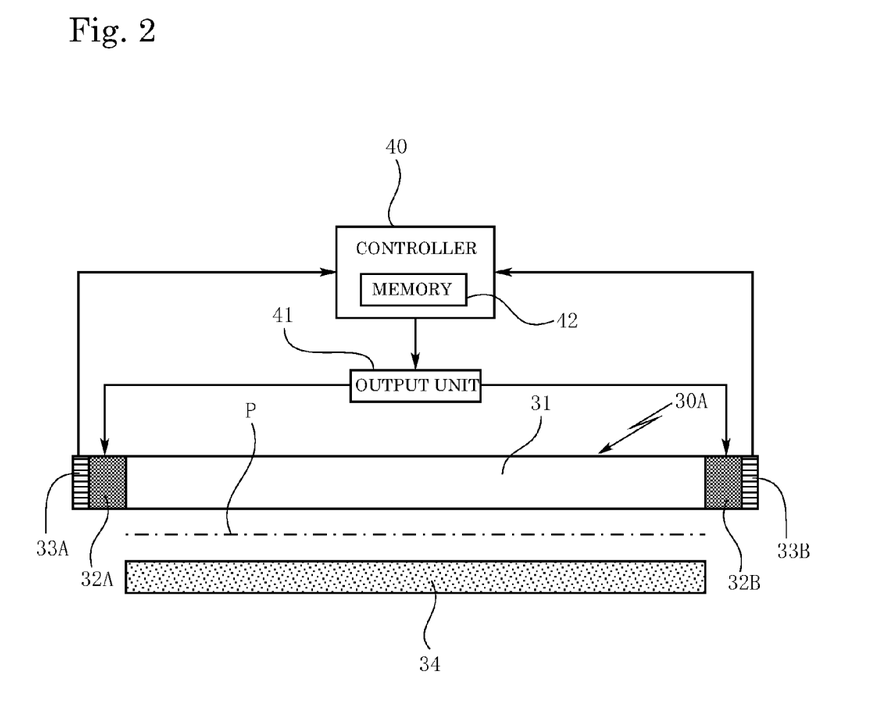
FIG. 2 is a schematic diagram illustrating an arrangement of a light source unit and the like used in an image scanning device according to an embodiment 1 of the invention.

As shown in FIG. 2, an image scanning device according to an embodiment 1 employs two LED light sources 32A, 32B for a light source unit 30A thereof. The LED light sources 32A, 32B are disposed at longitudinally opposite ends of a light guide 31, respectively. On the opposite sides from the light guide 31 of the LED light sources 32A, 32B, light intensity sensors 33A, 33B are provided. The light intensity sensor detects an intensity of light emitted from the LED light source 32A, 32B in the opposite direction from the light guide 31.

The above light guide 31 permits internal reflection and refraction of light emitted from the respective LED light sources 32A, 32B disposed at the longitudinally opposite ends thereof, thereby applying the light onto a reading position P in the form of a linear light beam extending in the longitudinal direction of the light guide 31.

The above light intensity sensors 33A, 33B detect the intensities of light from the LED light sources 32A, 32B and output the detected light intensities to a controller 40. Based on the light intensities thus detected, the controller 40 controls an output unit 41 for regulating outputs from the individual LED light sources 32A, 32B.

In this image scanning device, the above-described light guide 31 converts the lights from the LED light sources 32A, 32B into the linear light beam extending in the longitudinal direction thereof and directly applies the linear light beam onto the reading position P. Furthermore the light guide also applies the above-described linear light beam onto a reflective plate 34 disposed on the opposite side of the reading position P from the light guide 31, permitting the reflective plate 34 to reflect the linear light beam onto the reading position P. That is, the image scanning device is adapted to irradiate the reading position P with the light beams from the opposite sides thereof.

Figure 3:
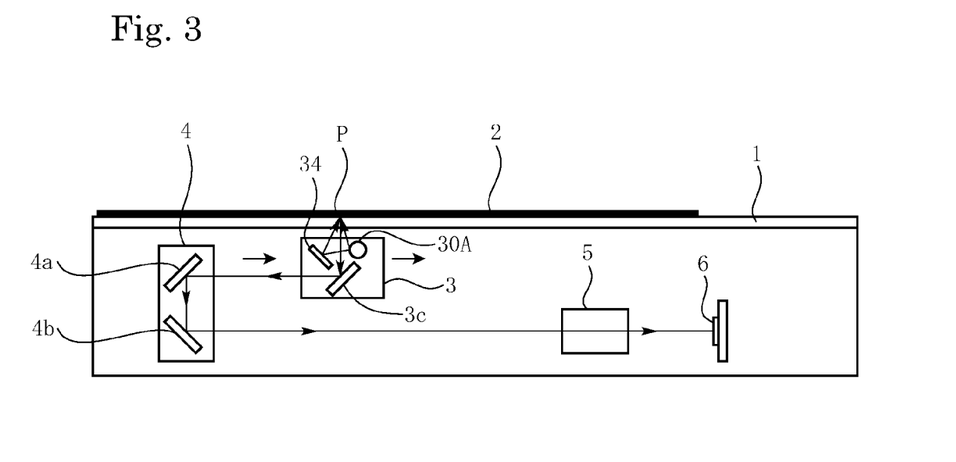
FIG. 3 is a schematic diagram illustrating how the image scanning device of the embodiment 1 reads a document placed on a glass platen.

As shown in FIG. 3, the image scanning device of the embodiment 1 is also arranged similarly to the conventional image scanning device shown in FIG. 1. The above light source unit 30A and the reflective plate 34 are housed in a first slider unit 3 driven by a motor (not shown) or the like. The reading position P for reading a document 2 placed on a glass platen 1 is irradiated with the light beams from the opposite sides thereof. Light reflected from the document 2 and carrying image information is reflected by a first reflective mirror 3c disposed in the first slider unit 3.

The light reflected by the first reflective mirror 3c and carrying the image information is reflected by a second reflective mirror 4a and a third reflective mirror 4b disposed in a second slider unit 4 driven by a motor (not shown) or the like. The reflected light is focused by a lens 5 onto a photoreceptive surface of an image reading element 6.

Similarly to the conventional image scanning device, this image scanning device is adapted to read the entire document 2 on the glass platen 1 by scanning with the above-described first slider unit 3 and second slider unit 4.

Figure 4:
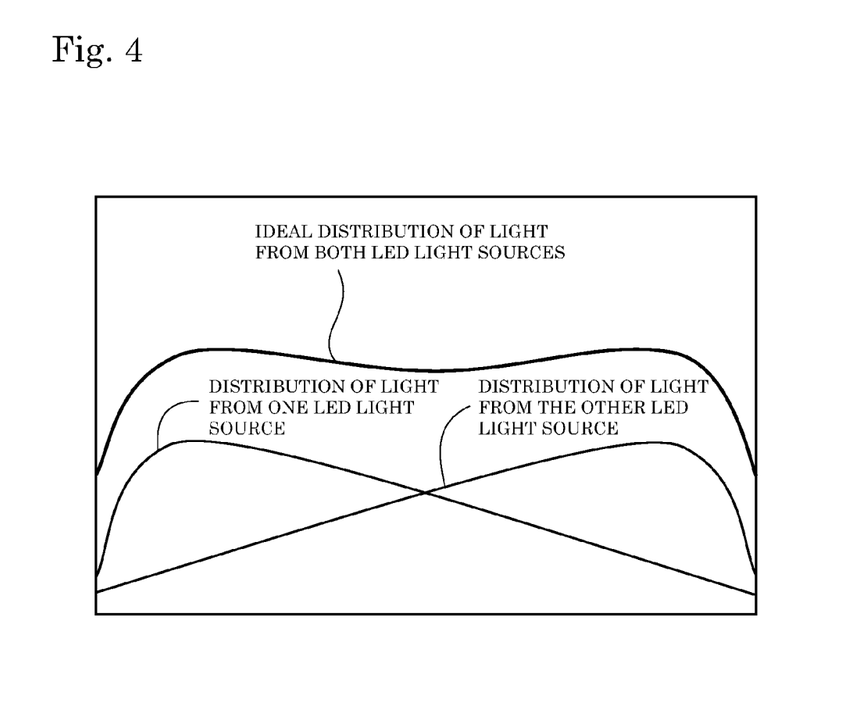
FIG. 4 is a schematic diagram illustrating respective ideal distributions of lights from the LED light sources discretely activated in the image scanning device of the embodiment 1 and an ideal distribution of the lights from the both LED light sources activated at a time.

According to the image scanning device of the embodiment 1, outputs that the output unit 41 provides through the respective LED light sources 32A, 32B are controlled as follows. The LED light source 32A, 32B is activated to apply the linear light beam onto a shading sheet (not shown) as a white reference member via the light guide 31 and the reflective plate 34 as described above. The light reflected from the shading sheet is focused on the photoreceptive surface of the image reading element 6 as described above. An ideal distribution of light emitted from these LED light sources 32A, 32B is determined as shown in FIG. 4.

The intensities of light from the LED light sources 32A, 32B at the time of ideal light distribution are detected by the respective corresponding light intensity sensors 33A, 33B. Thus, ideal light intensities of the LED light sources 32A, 32B are stored in a memory 42 installed in the above controller 40.

The LED light source 32A, 32B may be changed in luminous condition due to product-by-product variations of the LED light source 32A, 32R, temperature change, secular change and the like, so that the light intensity sensor 33A, 33B may detect a varied light intensity. In this case, the controller 40 compares the detected light intensity with the ideal light intensity of the LED light source 32A, 32B which is stored in the memory 42 thereof. According to the comparison result, the controller 40 regulates the output which the above output unit 41 provides via the LED light source 32A, 32B, thereby adjusting the light intensity detected by the light intensity sensor 33A, 33B to the ideal light intensity of the LED light source 32A, 32B.

This approach negates the need for the following operations to be performed each time the LED light source 32A, 32B is changed in the luminous condition. As described above, the operations include: irradiating the shading sheet as the white reference member with the linear light beams from the light guide 31 and the reflective plate 34; focusing the reflected light from the shading sheet on the photoreceptive surface of the image reading element 6; and making adjustment for achieving the ideal light distribution. In this approach, the outputs to the individual LED light sources 32A, 32B are adjusted based on the light intensities detected by the light intensity sensors 33A, 33B. This makes it easy to make adjustment for quickly achieving the ideal light distribution.

Embodiment 2

Figure 5:
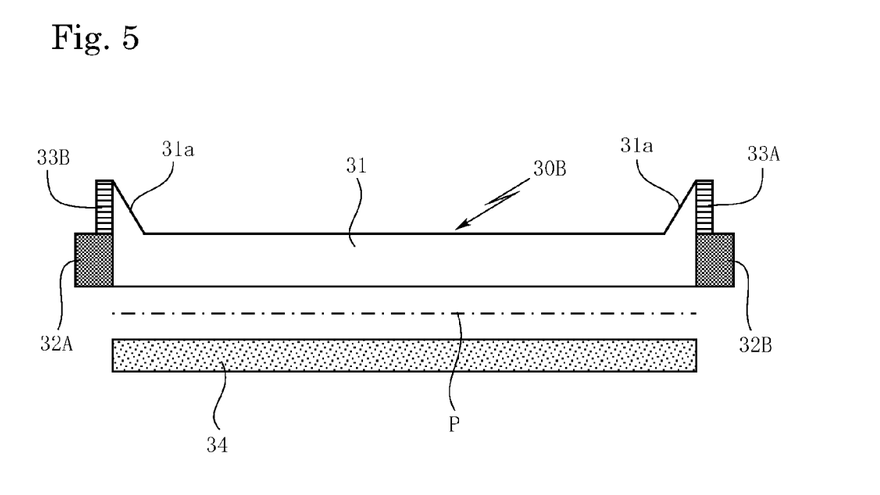
FIG. 5 is a schematic diagram illustrating an arrangement of a light source unit and the like used in an image scanning device according to an embodiment 2 of the invention.

As shown in FIG. 5, an image scanning device according to an embodiment 2 is essentially arranged the same way as the image scanning device of the embodiment 1 except for the light source unit.

A light source unit 30B of the image scanning device of the embodiment 2 comprises two LED light sources 32A, 32B disposed at the longitudinally opposite ends of the light guide 31, as shown in FIG. 5. The light source unit 30B further includes sloped and widened guide portions 31a at the longitudinally opposite ends of the light guide 31. The light intensity sensors 33A, 33B are each disposed at the guide portion 31a on the opposite side of the light guide 31 from each corresponding LED light source 32A, 32B, serving to detect an intensity of light conducted from each corresponding LED light source 32A, 32B through the light guide 31.

In this image scanning device as well, the above-described light guide 31 converts the lights from the LED light sources 32A, 32B into the linear light beam extending in the longitudinal direction thereof and directly applies the linear light beam onto the reading position P. Furthermore, the light guide also applies the above-described linear light beam onto the reflective plate 34 disposed on the opposite side of the reading position P from the light guide 31, permitting the reflective plate 34 to reflect the linear light beam onto the reading position P. That is, the image scanning device is adapted to irradiate the reading position P with the light beams from the opposite sides thereof.

In this image scanning device, an intensity of light emitted from each LED light source 32A, 32B and conducted through the light guide 31 is detected by each corresponding light intensity sensor 33A, 33B at the guide portion 31a on the opposite side of the light guide 31. The output to each LED light source 32A, 32B is adjusted based on the detected light intensity.

According to this image scanning device as described above, the intensity of light emitted from each LED light source 32A, 32B and conducted through the light guide 31 is detected by each corresponding light intensity sensor 33A, 33B at the guide portion 31a on the opposite side of the light guide 31. Unlike the LED light sources of the above embodiment 1, these LED light sources 32A, 32B are not required to emit light in the opposite direction from the light guide 31. Hence, each LED light source 32A, 32B can be covered with a light reflective member (not shown) or the like on its sides other than a side in face-to-face relation with the light guide 31 so that the light from each LED light source 32A, 32B can be totally conducted into the light guide 31. The light emitted from the LED light sources 32A, 32B can be used effectively.

Embodiment 3

Figure 6:
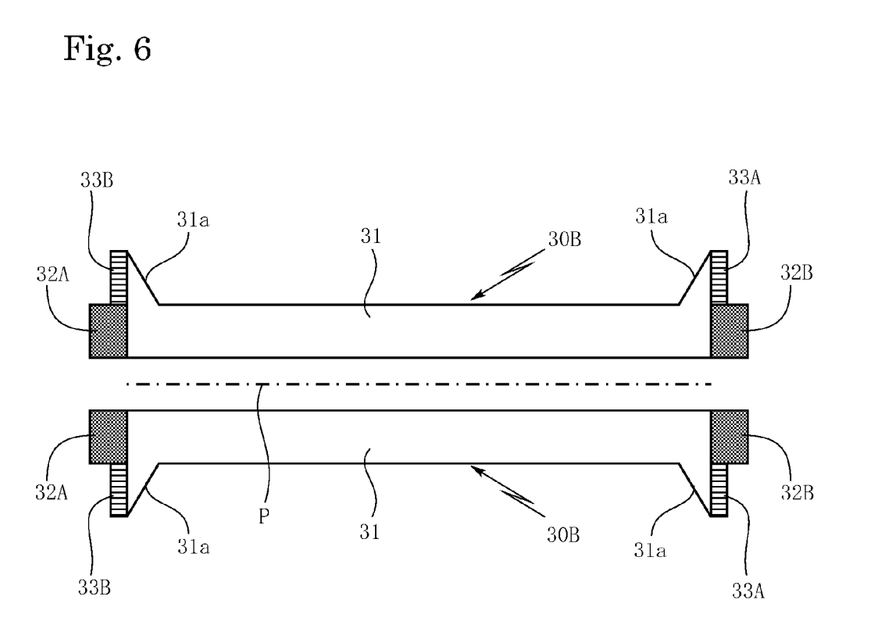
FIG. 6 is a schematic diagram illustrating an arrangement of a light source unit and the like used in an image scanning device according to an embodiment 3 of the invention.

An image scanning device according to an embodiment 3 employs the same light source unit 30B as that of the image scanning device of the above embodiment 2, as shown in FIG. 6.

In the image scanning device of the embodiment 3, another of the same light source unit 30B is disposed on the opposite side of the reading position P from the above light source unit 30B in face-to-face relation therewith. The reading position P is directly irradiated with the linear light beams emitted through the light guides 31 of the light source units 30B on the opposite sides of the reading position P.

This arrangement allows the reading position P to be irradiated with the sufficient light from the light source units 30B disposed on the opposite sides of the reading position P. Even when a three-dimensional object with shaded area is scanned, the object is irradiated with the constant light beams from the opposite sides thereof so that an image with less shaded area can be captured.

Embodiment 4

Figure 7:
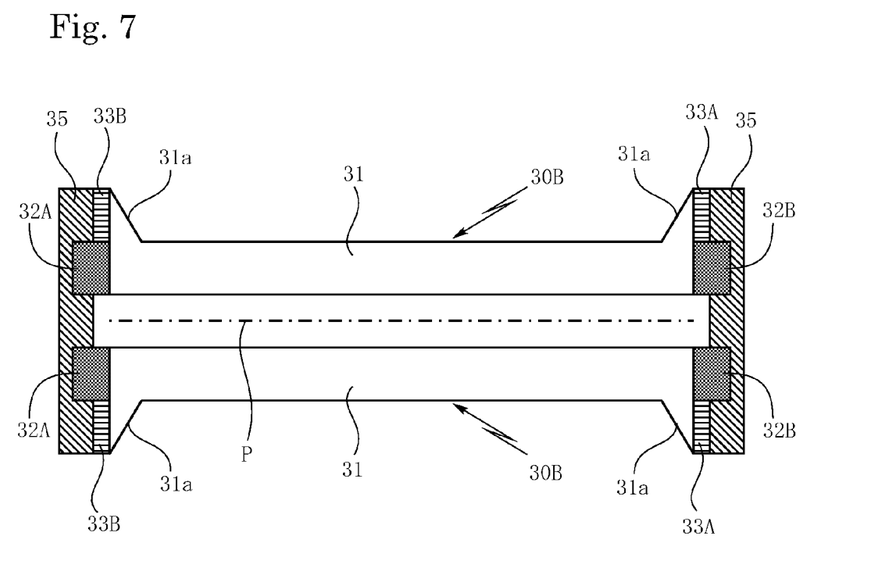
FIG. 7 is a schematic diagram illustrating an arrangement of a light source unit and the like used in an image scanning device according to an embodiment 4 of the invention.

In an image scanning device according to an embodiment 4, as shown in FIG. 7, the light source units 30B of the image scanning device of the embodiment 2 are provided on the opposite sides of the reading position P just as in the above-described embodiment 3.

In the image scanning device of the embodiment 4, each light guide 31 of each light source unit 30B is provided with retaining members 35 at opposite ends thereof. The LED light source 32A and the light intensity sensor 33B on one side of each light guide 31 are retained by one retaining member 35 while the LED light source 32B and the light intensity sensor 33A on the other side thereof are retained by the other retaining member 35. Thus, the two retaining members 35 each bridge the two light source units 30B.

This arrangement not only provides easy positioning of the individual light source units 30B but also achieves integration of harnesses interconnecting the LED light sources 32A and the light intensity sensors 33B retained by one retaining member 35 or the LED light sources 32B and the light intensity sensors 33A retained by the other retaining member 35 and of electronic parts constituting substrates. Thus, the number of components can be reduced.

Embodiment 5

Figure 8:
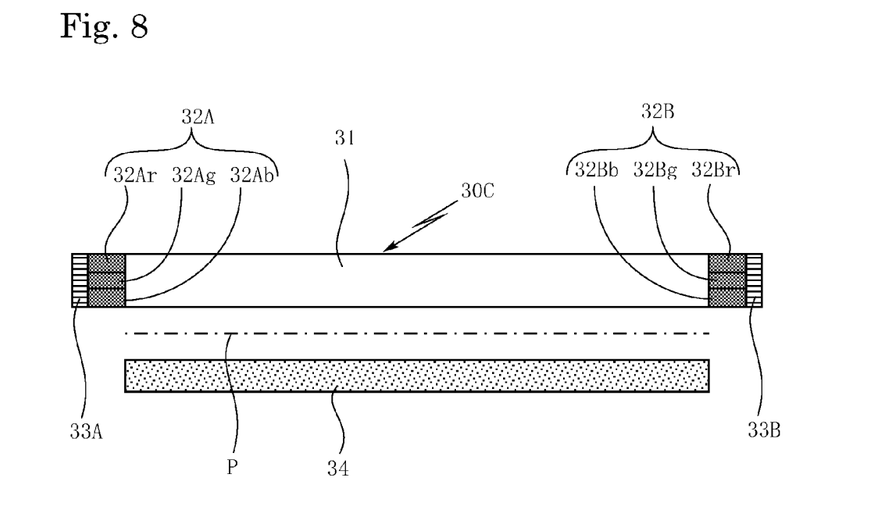
FIG. 8 is a schematic diagram illustrating an arrangement of a light source unit and the like used in an image scanning device according to an embodiment 5 of the invention.

An image scanning device of an embodiment 5 comprises a light source unit 30C, as shown in FIG. 8, wherein the light guide. 31 is provided with the two LED light sources 32A, 32B at the longitudinally opposite ends thereof and wherein, on the opposite sides from the light guide 31 of the LED light sources 32A, 32B, the light intensity sensors 33A, 33B are provided, the light intensity sensor detecting an intensity of light emitted from the LED light source in the opposite direction from the light guide 31. The image scanning device is provided with the reflective plate 34 on the opposite side of the reading position P from the light source unit 30C.

In the light source unit 30C of the image scanning device according to the embodiment 5, the LED light sources 32A, 32B each employ three color light sources which include a red LED light source 32Ar, 32Br emitting light having a wavelength in the red spectral region; a green LED light source 32Ag, 32Bg emitting light having a wavelength in the green spectral region; and a blue LED light source 32Ab, 32Bb emitting light having a wavelength in the blue spectral region.

On one side of the light guide, an intensity of light emitted from the three-color LED light sources 32Ar, 32Ag, 32Ab in the opposite direction from the light guide 31 is detected by the above light intensity sensor 33A. On the other side of the light guide, an intensity of light emitted from the three-color LED light sources 32Br, 32Bg, 32Bb in the opposite direction from the light guide 31 is detected by the above light intensity sensor 33B.

A white light is formed by mixing together the three color lights emitted from the three-color LED light sources 32Ar, 32Ag, 32Ab and the three-color LED light sources 32Br, 32Bg, 32Bb. In this case, the light source unit can emit a white light with consistent color tinge if an intensity of each color light is detected by each corresponding light intensity sensor 33A, 33B and adjusted accordingly. This eliminates the need for performing a cumbersome operation of correcting the tinge of color by referring to a color chart or the like.

In this embodiment 5, the reflective plate 34 is disposed on the opposite side of the reading position P from the light source unit 30C. However, this reflective plate 34 may also be replaced by another of the same light source unit 30C as described above.

Embodiment 6

Figure 9:
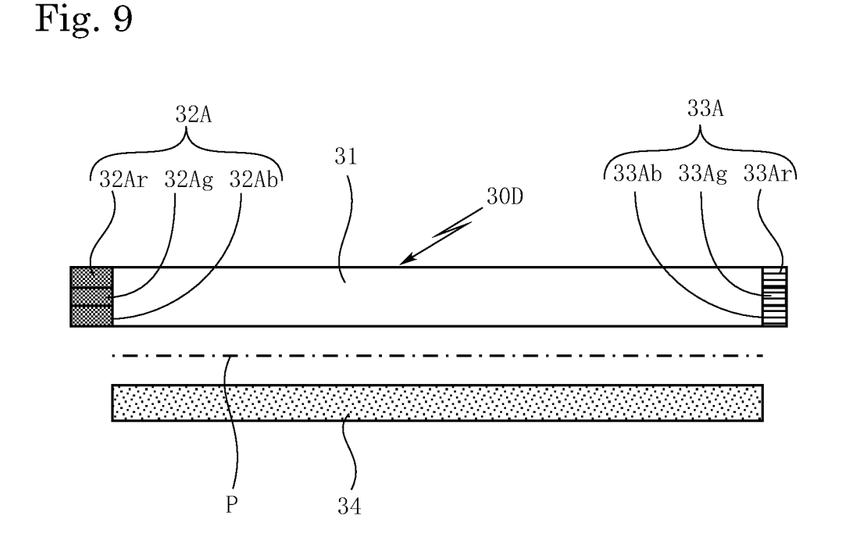
FIG. 9 is a schematic diagram illustrating an arrangement of a light source unit and the like used in an image scanning device according to an embodiment 6 of the invention.

As shown in FIG. 9, an image scanning device according to an embodiment 6 comprises a light source unit 30D wherein the same LED light source 32A as that of the above embodiment 5 is provided at one longitudinal end of the light guide 31. The LED light source 32A includes: the red LED light source 32Ar emitting the light having the wavelength in the red spectral region; the green LED light source 32Ag emitting the light having the wavelength in the green spectral region; and the blue LED light source 32Ab emitting the light having the wavelength in the blue spectral region. On the other hand, the light intensity sensor 33A is provided at the other longitudinal end of the light guide 31 for detecting an intensity of light emitted from the above LED light source 32A and conducted through the light guide 31. The light intensity sensor 33A includes: a red-light intensity sensor 33Ar for exclusively detecting an intensity of the light from the red LED light source 32Ar; a green-light intensity sensor 33Ag for exclusively detecting an intensity of the light from the green LED light source 32Ag; and a blue-light intensity sensor 33Ab for exclusively detecting an intensity of the light from the blue LED light source 32Ab.

The provision of the red-light intensity sensor 33Ar for exclusively detecting the intensity of the light from the red LED light source 32Ar, the green-light intensity sensor 33Ag for exclusively detecting the intensity of the light from the green LED light source 32Ag and the blue-light intensity sensor 33Ab for exclusively detecting the intensity of the light from the blue LED light source 32Ab offers the following advantage. If the above three-color LED light sources 32Ar, 32Ag, 32Ab are activated at a time, respective intensities of the three color lights can be detected correctly by the corresponding light intensity sensors 33Ar, 33Ag, 33Ab.

Therefore, in a case where the white light is formed by mixing together the three color lights emitted from the three-color LED light sources 32Ar, 32Ag, 32Ab, the above three-color light intensity sensors 33Ar, 33Ag, 33Ab can quickly detect the respective intensities of the three color lights, providing for the adjustment of the respective intensities of the color lights. The adjustment for forming the white light with consistent color tinge can be achieved quickly.

In this embodiment 6 as well, the reflective plate 34 is disposed on the opposite side of the reading position P from the light source unit 30D. However, this reflective plate 34 may also be replaced by another of the same light source unit 30D as described above.

As described above, the image scanning device of the invention comprises: the light source; the light guide converting the light from the light source into the linear light beam and applying the light beam onto the reading position; the image reading element for receiving the light reflected from the reading position; and the light intensity sensor for detecting the intensity of light emitted from the above light source. During the process where the light guide applies the light from the light source onto the reading position in the form of the linear light beam and the light reflected from the reading position is received by the image reading element, the intensity of light emitted from the light source is detected by the light intensity sensor.

Accordingly, the image scanning device of the invention can offer the following advantage even if the intensity of light emitted from the light source varies due to the change in the characteristics of the light source. The above light intensity sensor can quickly detect the change in the light intensity, providing for the proper correction of the intensity of light emitted from the light source.

Therefore, the image scanning device of the invention eliminates the need for the following cumbersome operations of the conventional device. In the case where the intensity of light emitted from the light source varies due to the change in the characteristics of the light source, the conventional practice requires the cumbersome operations of moving the first slider unit and second slider unit to locate the light guide with the LED light source at position corresponding to the shading sheet, applying the linear light beam onto the shading sheet via the light guide and permitting the shading sheet to reflect the light beam onto the photoreceptive surface of the image reading element.

In the case where the intensity of light emitted from the light source varies due to the change in the characteristics of the light soured, the image scanning device of the invention can properly correct the intensity of light to be emitted from the light source thereby quickly achieving the proper correction of the intensity and distribution of the linear light beam applied from the light source through the light guide. Hence, the image forming apparatus can be adequately prevented from suffering the decrease in the image formation efficiency.

The image scanning device of the invention may generally employ the LED light source as the above light source. The above light source may be at least provided at one longitudinal end of the light guide. It is particularly preferred to provide the light source at the longitudinally opposite ends of the light guide from the standpoint of improving the distributability of the linear light beams applied from the light guide.

The light intensity sensors for detecting the intensity of light emitted from the light source may be provided in the following manners. In a case where the light source is provided at one longitudinal end of the light guide, the light intensity sensor may be disposed on the opposite side of the light source from the light guide. Alternatively, the light intensity sensor may be disposed across the light guide from the light source. In the case where the light intensity sensor is disposed across the light guide from the light source, the light source need not emit the light in the opposite direction from the light guide because the light intensity sensor detects the light through the light guide. Hence, the loss of light emitted from the light source can be reduced.

The light guide serving to convert the light from the light source into the linear light beam and to apply the light beam onto the reading position may be provided on the opposite sides of the reading position. This arrangement provides uniform light radiation from the opposite sides of the reading position. If a three-dimensional object with shaded area is scanned, the object is irradiated with the constant light beams from the opposite sides thereof so that an image with less shaded area can be captured.

The above light source may employ a plurality of light sources emitting lights having different wavelengths. If light of a consistent color is formed using the multiple light sources, the tinge of color can be properly corrected without performing the operation of correcting the color tinge with reference to the color chart.

In a case where an image scanning device capable of scanning both a color image and a monochromatic image scans a color image, the light is corrected in color tinge to provide white light for faithful color reproduction. In a case where the image scanning device scans a monochromatic image, on the other hand, the light is corrected in color tinge to provide an intensely green colored light having higher luminosity function. The image scanning device of the invention facilitates such correction operations.

In the aforementioned case where the multiple light sources emitting lights of different wavelengths are employed, multiple light intensity sensors may be provided in correspondence to the respective light sources for detecting respective intensities of the lights of the different wavelengths. This arrangement provides for quick, easy and correct detection of the respective intensities of lights from the light sources because the multiple light intensity sensors can detect the respective intensities of the lights emitted from the corresponding light sources, which are activated at a time. The proper correction of color tinge can be accomplished more quickly.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

The invention claimed is:

1. An image scanning device comprising:
   a slider unit that is movable within the image scanning device during a scanning operation;
   a light source in the slider unit;
   a light guide provided with the light source in the slider unit, for converting light from the light source into a linear light beam and applying the linear light beam onto a reading position;
   an image reading element for receiving the light beam reflected from the reading position; and
   a light intensity sensor provided in the slider unit, for detecting an intensity of the light emitted from the light source.

2. The image scanning device according to claim 1, wherein the light source comprises a light-emitting diode.

3. The image scanning device according to claim 1, wherein the light source is at least provided at one longitudinal end of the light guide.

4. The image scanning device according to claim 1, wherein the light source is provided at longitudinally opposite ends of the light guide.

5. The image scanning device according to claim 1, wherein the light intensity sensor is disposed across the light guide from the light source.

6. The image scanning device according to claim 1, wherein the light guide for converting the light from the light source into the linear light beam and applying the linear light beam onto the reading position is provided on the opposite sides of the reading position.

7. The image scanning device according to claim 1, wherein the light source comprises a plurality of light sources emitting lights of different wavelengths.

8. The image scanning device according to claim 7, wherein as the light intensity sensor for detecting the intensity of the light emitted from the light source, a plurality of light intensity sensors are provided in correspondence to the multiple light sources for detecting respective intensities of the lights of different wavelengths.

9. The image scanning device according to claim 1, further comprising a controller for controlling an output of the light source,
   wherein the controller has a reference light intensity for the light source previously stored therein and provides control to adjust the intensity of the light emitted from the light source to the reference light intensity in a case where the light intensity sensor detects change in the intensity of the light emitted from the light source.

10. The image scanning device according to claim 1, wherein the light guide includes a sloped portion at a longitudinal end of the light guide.

11. The image scanning device according to claim 10, wherein the light intensity sensor is provided at the sloped portion.

12. The image scanning device according to claim 10, wherein the light source is provided on the light guide at a location other than at the sloped portion.

13. The image scanning device according to claim 1, wherein the light intensity sensor is provided on the light source.

* * * * *